United States Patent
Agur et al.

(10) Patent No.: US 10,395,303 B1
(45) Date of Patent: Aug. 27, 2019

(54) SYSTEM, METHOD, AND COMPUTER PROGRAM FOR TRANSFORMING ORDER REQUESTS FROM EXTERNAL CHANNELS INTO A FORMAT ASSOCIATED WITH A SERVICE PROVIDER

(71) Applicant: Amdocs Software Systems Limited, Dublin (IE)

(72) Inventors: Eadan Agur, Givatayim (IL); Tomer Sadan, Tel-Mond (IL); Yakov Eini, Modiin (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 665 days.

(21) Appl. No.: 14/789,872

(22) Filed: Jul. 1, 2015

Related U.S. Application Data

(60) Provisional application No. 62/020,933, filed on Jul. 3, 2014.

(51) Int. Cl.
  *G06Q 30/00* (2012.01)
  *G06Q 30/06* (2012.01)

(52) U.S. Cl.
  CPC ................ *G06Q 30/0635* (2013.01)

(58) Field of Classification Search
  CPC .................................... G06Q 30/06
  USPC ................................. 705/26.1, 27.1
  See application file for complete search history.

(56) References Cited

U.S. PATENT DOCUMENTS

| | | | | |
|---|---|---|---|---|
| 8,756,117 B1 * | 6/2014 | Ballaro | ............ | G06Q 10/087 705/26.1 |
| 2002/0143655 A1 * | 10/2002 | Elston | ............ | G06Q 20/02 705/26.81 |
| 2003/0204448 A1 * | 10/2003 | Vishik | ............ | G06Q 30/0258 705/26.4 |
| 2004/0102999 A1 * | 5/2004 | Monson | ............ | G06Q 10/10 705/2 |
| 2006/0010054 A1 * | 1/2006 | Gee | ............ | G06Q 10/087 705/35 |
| 2010/0251264 A1 * | 9/2010 | McGuire | ............ | G06Q 10/0637 719/317 |
| 2011/0258083 A1 * | 10/2011 | Ren | ............ | G06Q 10/087 705/27.1 |
| 2015/0178801 A1 * | 6/2015 | Okada | ............ | G06Q 30/0601 705/26.1 |

OTHER PUBLICATIONS

Shi, J., Du, G., & Xiong, D. "An Incomplete Order Decision Table Reduction Algorithm Based on Granular Computing," Jisuanji Yingyong Yu Ruanjian/ Computer Applications and Software, (2012), 29(10), 113-116.*

* cited by examiner

*Primary Examiner* — Brandy A Zukanovich
(74) *Attorney, Agent, or Firm* — Zilka-Kotab, P.C.

(57) ABSTRACT

A system, method, and computer program product are provided for transforming order requests from external channels into a format associated with a service provider. In use, at least one new order request is received from at least one of a plurality of external order channels. Additionally, the at least one new order request is transformed into a predefined format associated with a service provider system. Further, the at least one new order request in the predefined format is sent to the service provider system.

14 Claims, 4 Drawing Sheets

SYSTEM, METHOD, AND COMPUTER PROGRAM FOR TRANSFORMING ORDER REQUESTS FROM EXTERNAL CHANNELS INTO A FORMAT ASSOCIATED WITH A SERVICE PROVIDER

CLAIM OF PRIORITY AND RELATED APPLICATIONS

This application claims the benefit of U.S. Provisional Application No. 62/020,933, filed Jul. 3, 2014, the entire contents of which are incorporated herein by reference.

FIELD OF THE INVENTION

The present invention relates to product and service providers, and more particularly to facilitating order requests associated with product and service providers.

BACKGROUND

Sales of communication services from independent retailers that are not owned by telecom operators has increased recently. For example, order requests may be initiated using different channels, such as web-portals, e-commerce portals, retailer call centers, and direct retail sales systems. These order requests may be split to different Communication Service Providers (CSPs) according to the service type request.

The indirect channels are not part of the Communication Service Providers' systems and the new order requests may arrive in various formats and in various forms of communication. It is a challenge for IT organizations (CSP IT organizations and indirect channel IT organizations) to support the various formats with only minimal changes in the IT systems. This challenge may arise whenever a Communication Service Provider ordering system integrates to a new indirect channel.

There is thus a need for addressing these and/or other issues associated with the prior art.

SUMMARY

A system, method, and computer program product are provided for transforming order requests from external channels into a format associated with a service provider. In use, at least one new order request is received from at least one of a plurality of external order channels. Additionally, the at least one new order request is transformed into a predefined format associated with a service provider system. Further, the at least one new order request in the predefined format is sent to the service provider system.

DETAILED DESCRIPTION

Figure 1:
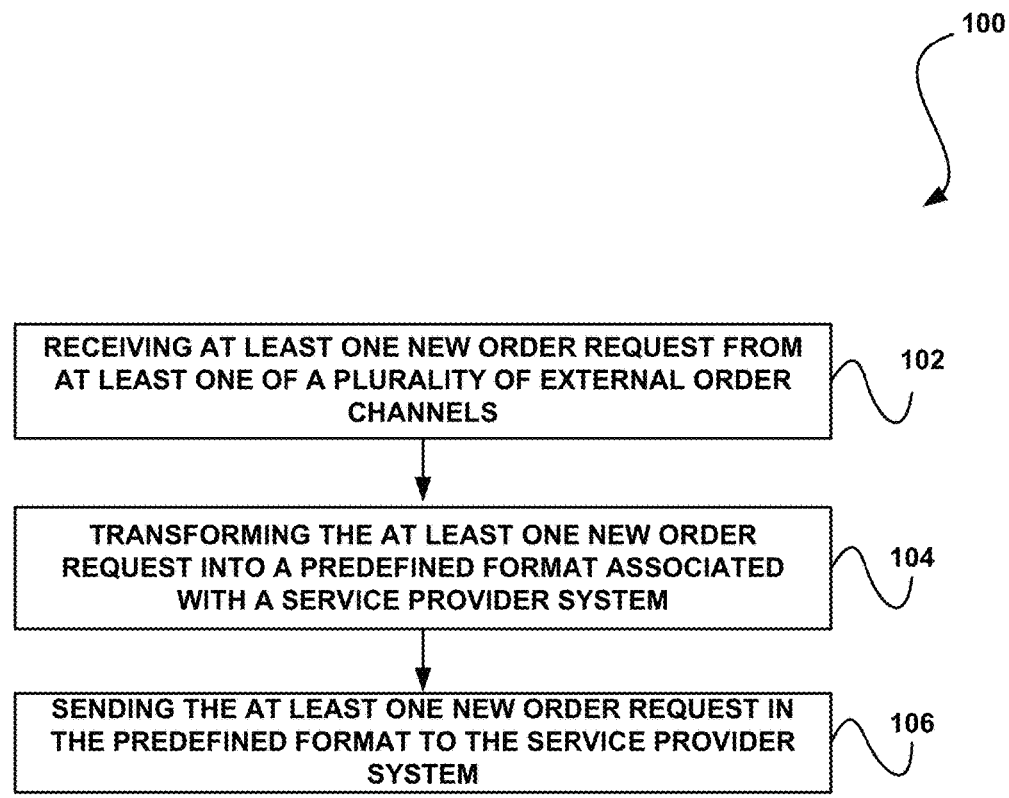
FIG. 1 illustrates a method for transforming order requests from external channels into a format associated with a service provider, in accordance with one embodiment.

FIG. 1 illustrates a method 100 for transforming order requests from external channels into a format associated with a service provider, in accordance with one embodiment.

As shown, at least one new order request is received from at least one of a plurality of external order channels. See operation 102. The order request may be associated with an order of any product and/or service.

The external channels may include any type of channel, such as web-portals, e-commerce portals, retailer call centers, and direct retail sales systems. Moreover, the plurality of external order channels may be associated with networks, point of sale terminals, retail systems, whole sale systems, or call centers, etc.

Additionally, the at least one new order request is transformed into a predefined format associated with a service provider system. See operation 104. The predefined format may include any format associated with the service provider system. The service provider system may include a variety of systems associated with a communication service provider.

Further, the at least one new order request in the predefined format is sent to the service provider system. See operation 106.

In one embodiment, the method 100 may include determining whether one or more mandatory parameters are missing from the new order request. The mandatory parameters may be required to transform the at least one new order request into the predefined format. In this case, the method 100 may include utilizing one or more business rules to transform the at least one new order request into the predefined format, if it is determined that mandatory parameters are missing from the new order request.

The common predefined format may be utilized in various ways. For example, in one embodiment, the predefined format may be capable of being utilized for error identification associated with the new order request. Also, the predefined format may be capable of being utilized for validation of the new order request. Additionally, in one embodiment, a plurality of new order requests that are in the predefined format may be stored in an orders repository (e.g. prior to sending to the service provider, for logging, etc.).

Utilizing the method 100, ordering initiation adapters may be implemented as a layer in an order gateway service that will collect all the new orders from different indirect channels with different formats and transform them into a single format.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
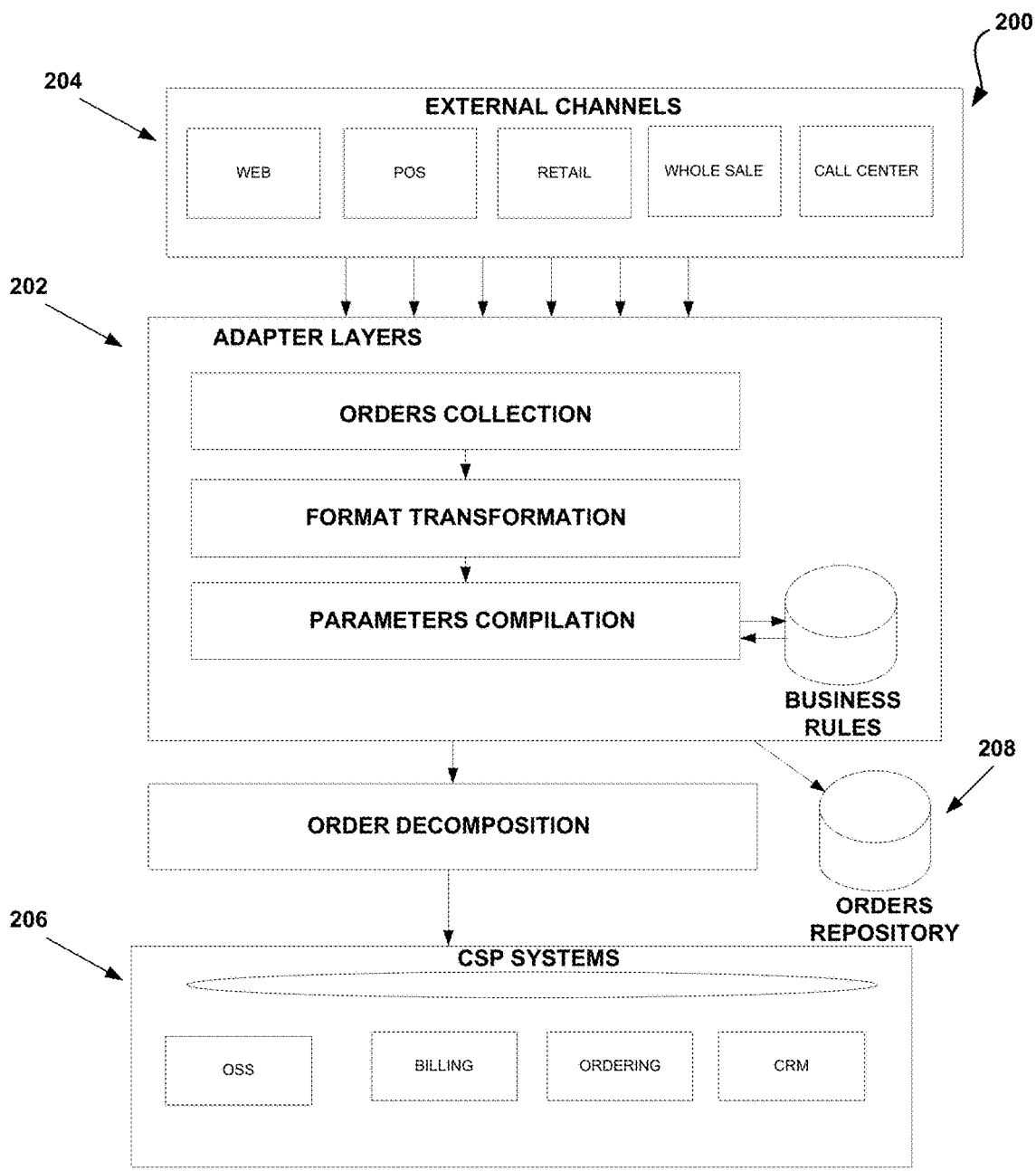
FIG. 2 illustrates a system diagram for transforming order requests from external channels into a format associated with a service provider, in accordance with one embodiment.

FIG. 2 illustrates a system diagram 200 for transforming order requests from external channels into a format associated with a service provider, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, one or more adapter layers 202 are in communication with a plurality of external channels 204. The adapter layers 202 are also in communication with one or more service provider systems 206.

In operation, a program implemented by the system 200 may provide the adapter layer 202 for new order requests received from the different indirect channels 204. The adaptive layer 202 may collect the order requests and create a single format for them before continuing the order process.

During this process, in some cases, mandatory parameters may be missing, which are needed to create the single format for the order requests. In this case, the order requests may be handled by one or more business rules that are defined in the adapter layer 202. The service provider may define various business rules for handling the order requests.

The adapter layer 202 may function as an integration repository for different indirect channels that can be reused by other service provider ordering systems using an order gateway service.

The single format that is created by the adapter layer 202 will improve the handling of the order entry to identify errors, validate the request, save the request in an orders repository 208, and/or monitor the request.

In this way, the adapter layer 202 may function as one solution to collect all the new order requests from the different indirect channels and create one format for the requests before sending them to the service provider (e.g. CSP, etc.) BSS systems 206.

This technique reduces cost and complexity by reusing the same solution from the indirect channels to the CSP BSS Systems. This technique also allows for creation of one format for all order requests to simplify the orders entry operational.

Figure 3:
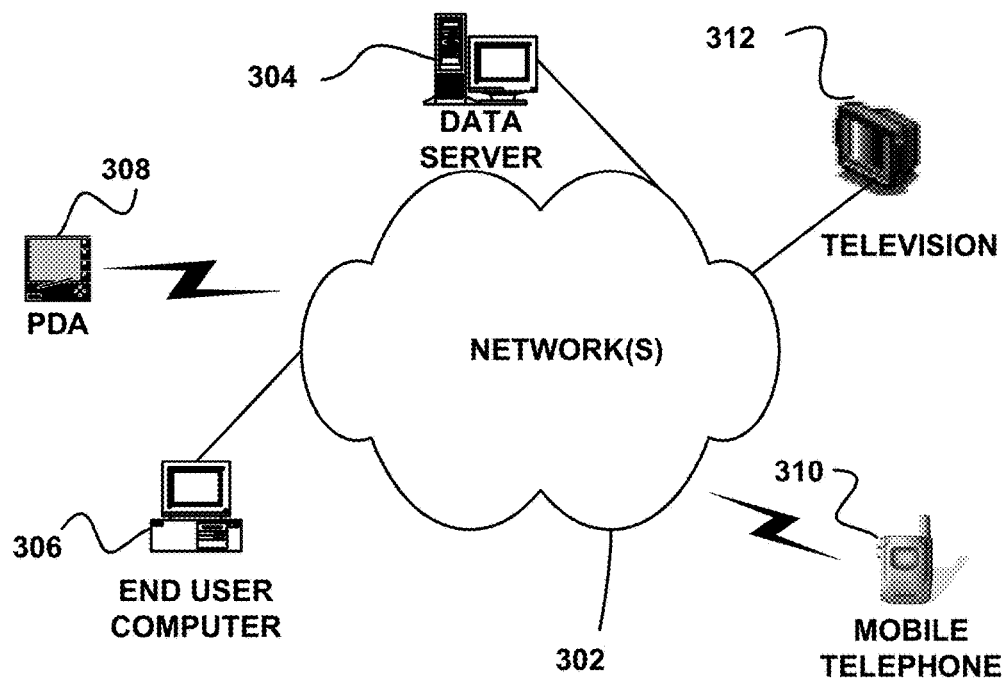
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
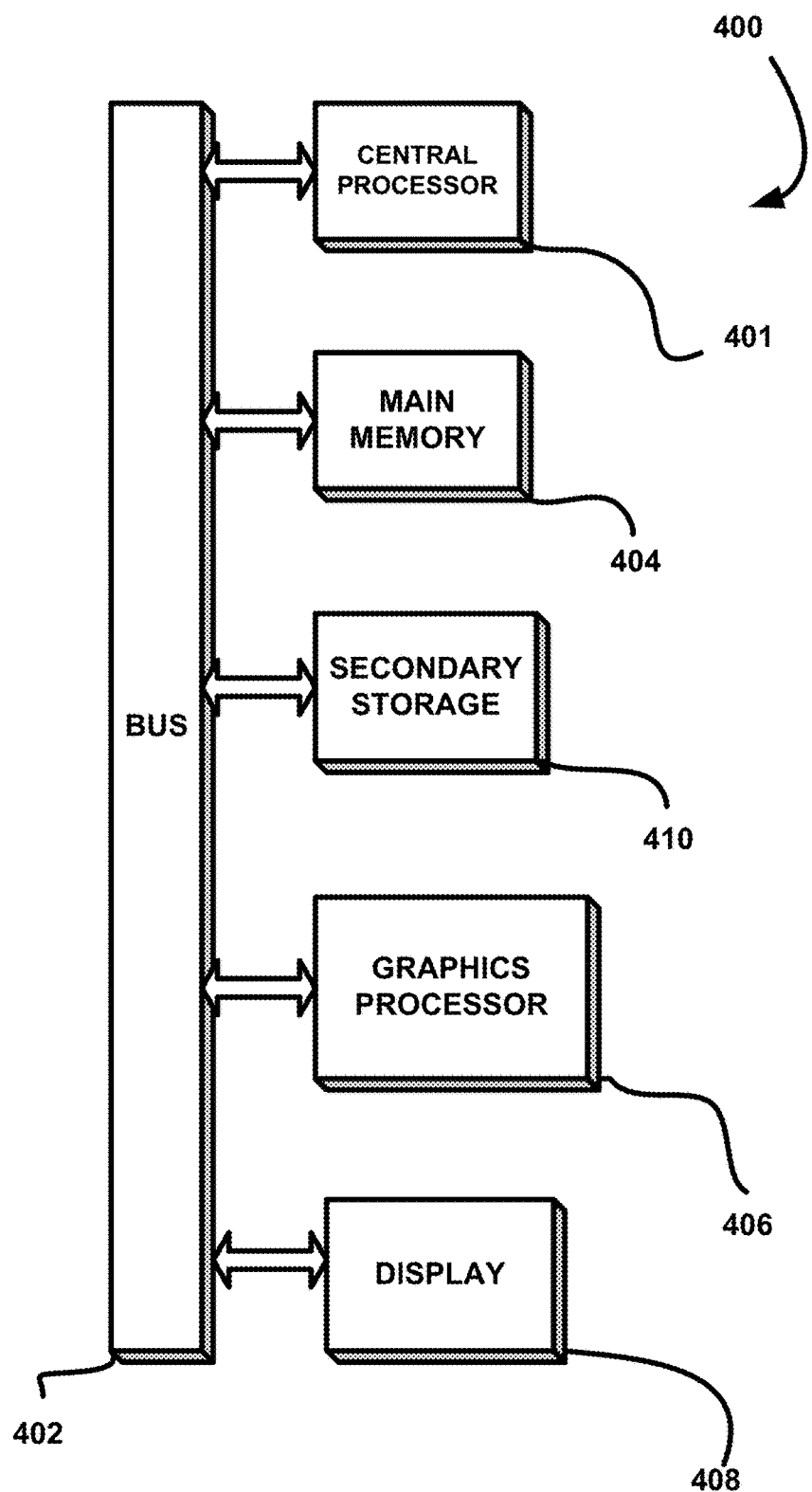
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving, at a gateway to an order processing system of a communications service provider and to a second order processing system of a second communications service provider, a plurality of new order requests in different formats from a plurality of different order channels external to the order processing system of the communications service provider, the new order requests being orders for at least one of products or services of the communications service provider;

initiating, by the gateway to the order processing system of the communications service provider, transformation of the new order requests into a predefined format associated with the order processing system of the communications service provider;

during the transforming of the new order requests into the predefined format, determining, by the gateway to the order processing system:

a first subset of the new order requests for which the transforming is not completed due to each of the new order requests in the first subset having missing mandatory parameters required to complete the transforming, and a second subset of the new order requests for which the transforming is completed due to each of the new order requests in the second subset not missing the mandatory parameters required to complete the transforming;

handling, by the gateway to the order processing system of the communications service provider, the new order requests in the first subset for which the transforming is not completed, according to one or more business rules predefined in the gateway by the communications service provider;

sending, by the gateway to the order processing system of the communications service provider, the new order requests in the second subset for which the transforming of the new order requests into the predefined format is completed, for processing thereof;

receiving, at the gateway, a plurality of second new order requests in the different formats from the plurality of different order channels external to the second order processing system of the second communications service provider, the second new order requests being second orders for at least one of products or services of the second communications service provider, and the second communications service provider being separate from the communications service provider;

initiating, by the gateway, transformation of the second new order requests into a second predefined format associated with the second order processing system of the second communications service provider;

during the transforming of the second new order requests into the second predefined format, determining, by the gateway:
- a first subset of the second new order requests for which the transforming is not completed due to each of the second new order requests in the first subset having missing mandatory parameters required to complete the transforming, and
- a second subset of the second new order requests for which the transforming is completed due to each of the second new order requests in the second subset not missing the mandatory parameters required to complete the transforming;

handling, by the gateway, the second new order requests in the first subset for which the transforming is not completed, according to one or more second business rules predefined in the gateway by the second communications service provider; and sending, by the gateway to the second order processing system of the second communications service provider, the second new order requests in the second subset for which the transforming of the second new order requests into the predefined format is completed, for processing thereof.

2. The method of claim 1, wherein the predefined format is utilized for error identification associated with the new order requests.

3. The method of claim 1, wherein the predefined format is utilized for validation of the new order requests.

4. The method of claim 1, further comprising storing, by the gateway in an orders repository, the new order requests that are in the predefined format.

5. The method of claim 1, wherein the plurality of different order channels are associated with at least one of a network, a point of sale terminal, a retail system, a whole sale system, or a call center.

6. A non-transitory computer readable medium storing computer code executable by a computer processor to perform a method comprising:

receiving, at a gateway to an order processing system of a communications service provider and to a second order processing system of a second communications service provider, a plurality of new order requests in different formats from a plurality of different order channels external to the order processing system of the communications service provider, the new order requests being orders for at least one of products or services of the communications service provider;

initiating, by the gateway to the order processing system of the communications service provider, transformation of the new order requests into a predefined format associated with the order processing system of the communications service provider;

during the transforming of the new order requests into the predefined format, determining, by the gateway to the order processing system:
- a first subset of the new order requests for which the transforming is not completed due to each of the new order requests in the first subset having missing mandatory parameters required to complete the transforming, and
- a second subset of the new order requests for which the transforming is completed due to each of the new order requests in the second subset not missing the mandatory parameters required to complete the transforming;

handling, by the gateway to the order processing system of the communications service provider, the new order requests in the first subset for which the transforming is not completed, according to one or more business rules predefined in the gateway by the communications service provider;

sending, by the gateway to the order processing system of the communications service provider, the new order requests in the second subset for which the transforming of the new order requests into the predefined format is completed, for processing thereof;

receiving, at the gateway, a plurality of second new order requests in the different formats from the plurality of different order channels external to the second order processing system of the second communications service provider, the second new order requests being second orders for at least one of products or services of the second communications service provider, and the second communications service provider being separate from the communications service provider;

initiating, by the gateway, transformation of the second new order requests into a second predefined format associated with the second order processing system of the second communications service provider;

during the transforming of the second new order requests into the second predefined format, determining, by the gateway:
- a first subset of the second new order requests for which the transforming is not completed due to each of the second new order requests in the first subset having missing mandatory parameters required to complete the transforming, and
- a second subset of the second new order requests for which the transforming is completed due to each of the second new order requests in the second subset not missing the mandatory parameters required to complete the transforming;

handling, by the gateway, the second new order requests in the first subset for which the transforming is not completed, according to one or more second business rules predefined in the gateway by the second communications service provider; and sending, by the gateway to the second order processing system of the second communications service provider, the second new order requests in the second subset for which the transforming of the second new order requests into the predefined format is completed, for processing thereof.

7. The non-transitory computer readable medium of claim 6, wherein the predefined format is utilized for error identification associated with the new order requests.

8. The non-transitory computer readable medium of claim 6, wherein the predefined format is utilized for validation of the new order requests.

9. The non-transitory computer readable medium of claim 6, further comprising storing, by the gateway in an orders repository, the new order requests that are in the predefined format.

10. The non-transitory computer readable medium of claim 6, wherein the plurality of different order channels are associated with at least one of a network, a point of sale terminal, a retail system, a whole sale system, or a call center.

11. A system comprising:
a gateway coupled to an ordering system of a communications service provider and to a second order processing system of a second communications service provider, including:
a memory system; and
one or more processing cores coupled to the memory system and that are each configured to:
receive, at the gateway, a plurality of new order requests in different formats from a plurality of different order channels external to the order processing system of the communications service provider, the new order requests being orders for at least one of products or services of the communications service provider;
initiate, by the gateway to the order processing system of the communications service provider, transformation of the new order requests into a predefined format associated with the order processing system of the communications service provider;
during the transforming of the new order requests into the predefined format, determine, by the gateway:
 a first subset of the new order requests for which the transforming is not completed due to each of the new order requests in the first subset having missing mandatory parameters required to complete the transforming, and
 a second subset of the new order requests for which the transforming is completed due to each of the new order requests in the second subset not missing the mandatory parameters required to complete the transforming;
handle, by the gateway, the new order requests in the first subset for which the transforming is not completed, according to one or more business rules predefined in the gateway by the communications service provider;
send, by the gateway, the new order requests in the second subset for which the transforming of the new order requests into the predefined format is completed, for processing thereof;
receive, at the gateway, a plurality of second new order requests in the different formats from the plurality of different order channels external to the second order processing system of the second communications service provider, the second new order requests being second orders for at least one of products or services of the second communications service provider, and the second communications service provider being separate from the communications service provider;
initiate, by the gateway, transformation of the second new order requests into a second predefined format associated with the second order processing system of the second communications service provider;
during the transforming of the second new order requests into the second predefined format, determine, by the gateway:
 a first subset of the second new order requests for which the transforming is not completed due to each of the second new order requests in the first subset having missing mandatory parameters required to complete the transforming, and
 a second subset of the second new order requests for which the transforming is completed due to each of the second new order requests in the second subset not missing the mandatory parameters required to complete the transforming;
handle, by the gateway, the second new order requests in the first subset for which the transforming is not completed, according to one or more second business rules predefined in the gateway by the second communications service provider; and
send, by the gateway to the second order processing system of the second communications service provider, the second new order requests in the second subset for which the transforming of the second new order requests into the predefined format is completed, for processing thereof.

12. The system of claim 11, wherein the system is operable such that the predefined format is utilized for error identification associated with the new order requests.

13. The system of claim 11, wherein the system is operable such that the predefined format is utilized for validation of the new order requests.

14. The system of claim 11, wherein the system is further configured to store, by the gateway in an orders repository, the new order requests that are in the predefined format.

* * * * *